United States Patent Office 2,755,725
Patented July 24, 1956

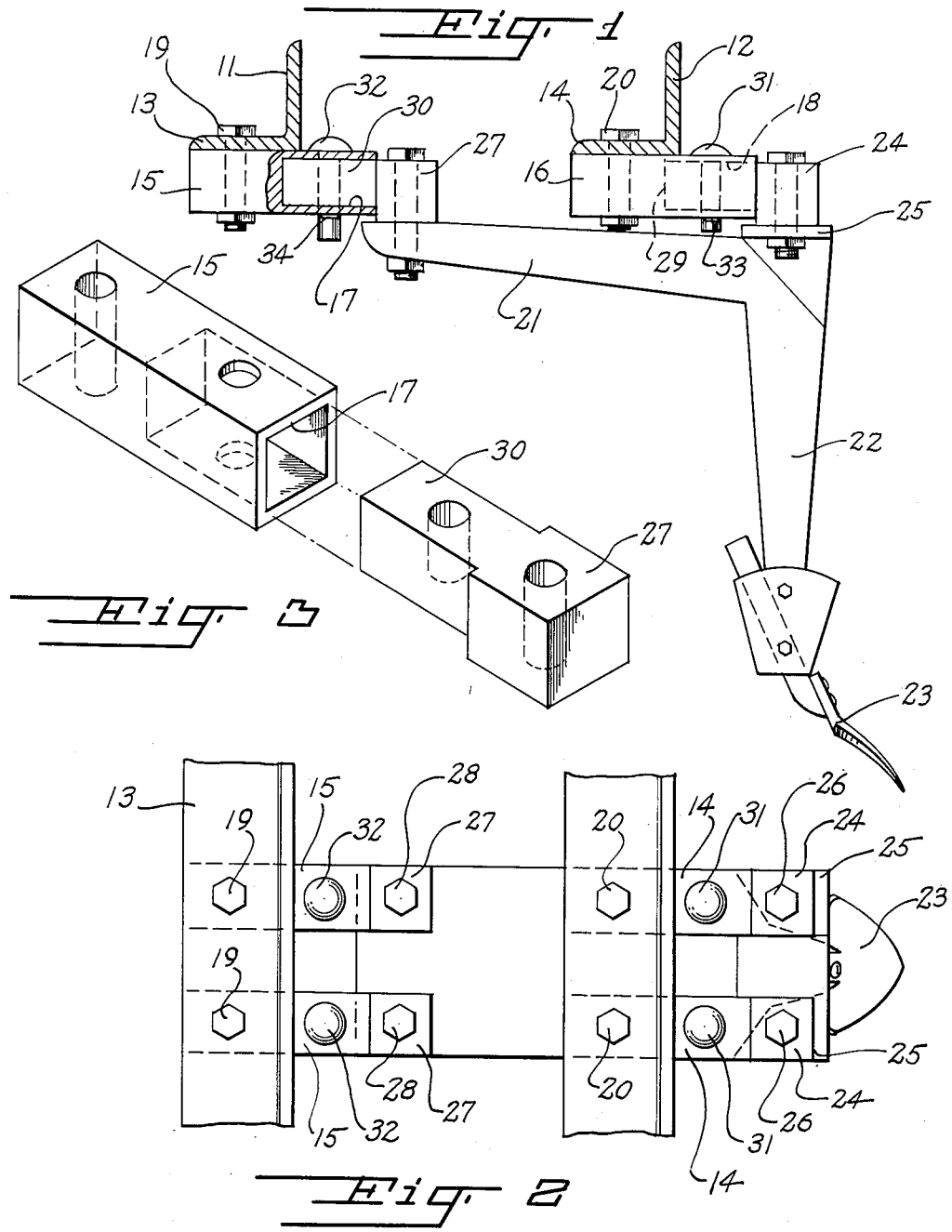

2,755,725

CULTIVATOR TINE COUPLING HITCH

Bruce F. Clark, Cairo, Ga.

Application April 5, 1955, Serial No. 499,289

4 Claims. (Cl. 97—198.1)

This invention relates to farm implements, and more particularly to an improved coupling hitch for cultivator tines.

The main object of the invention is to provide a novel and improved attaching means for connecting a cultivator beam to the frame of the associated cultivator, the improved attaching means involving simple components, being easy to install on a cultivator, and providing a substantial saving in time and labor in attaching or removing the cultivator beam from the cultivator frame.

A further object of the invention is to provide an improved cultivator beam hitch means for removably attaching the tine beam of a cultivator to the frame of the cultivator, said attaching means involving inexpensive components, being durable in construction, and being arranged so that the cultivator beam may be attached or detached from the cultivator without requiring the use of any special tools.

Further objects and advantages of the invention will become apparent from the following description and claims, and from the accompanying drawings, wherein:

Figure 1 is a longitudinal vertical cross sectional view taken through a portion of a cultivator frame provided with a tine beam member which is detachably secured to the frame by improved hitch means constructed in accordance with the present invention.

Figure 2 is a top plan view of the structure shown in Figure 1.

Figure 3 is a perspective view, to an enlarged scale, of one of the box elements and the associated hitch pin element, employed in fastening the tine beam of Figures 1 and 2 to the frame of the cultivator.

Referring to the drawings, 11 and 12 respectively designate standard transverse supports forming part of the frame of a conventional cultivator, the supports 11 and 12 being in the form of transversely extending angle bars having the horizontal flanges shown respectively at 13 and 14.

Secured to the respective flanges 13 and 14 are the horizontal, longitudinally directed and longitudinally aligned box elements 15 and 16, said box elements being rectangular in transverse cross section and being formed with the rectangular bores shown respectively at 17 and 18. The box elements 15 and 16 are secured to the horizontal flanges 13 and 14 of the transverse cultivator frame members 11 and 12 by respective fastening bolts 19 and 20 extending vertically through the solid portions of the respective box elements 15 and 16, as shown in Figure 1.

As illustrated in Figure 2, each transverse frame bar 11 and 12 carries a pair of box elements in spaced side by side relationship, the transverse frame bar 11 carrying the spaced box elements 15, 15 and the transverse bar 12 carrying the spaced box elements 14, 14, the respective box elements being arranged in the manner illustrated in Figure 2.

Designated at 21 is a longitudinally extending cultivator beam member provided at its end with the substantially vertical depending standard 22 to which is attached the cultivator plow or tine member 23.

Secured to the end portion of the beam 21 overlying the standard 22 are the spaced pin blocks 24, 24, said blocks being secured to respective flange elements 25 on the beam 21 by vertical bolts 26. Secured similarly to the opposite end portion of the beam 21 are the respective pin blocks 27, 27, said blocks 27 being fastened to the beam 21 by respective vertical bolts 28, 28.

The pin blocks 24 and 27 are integrally formed with horizontally extending rectangular pin elements 29 and 30 which are respectively received in the rectangular bores 18 and 17 of the respective box members 16 and 15 and which are secured in said bores by respective vertical headed pin members 31, 31 and 32, 32 engaged through the top and bottom walls of the box members and through the rectangular pin elements 29 and 30 received therein.

As shown in Figure 1, the respective pin elements 31 and 32 are retained in position by respective cotter pins 33 and 34 extending through the lower portions of the shanks of said pin elements and underlying the bottom walls of the respective box elements 16 and 15.

It will be readily apparent that in order to detach the beam member 21 from the cultivator frame, it is merely necessary to remove the cotter pins 33 and 34 and to lift out the fastening pins 31 and 32, whereby the beam 21 may be detached by moving same longitudinally away from the box members 15 and 16. The beam may be replaced by a reverse procedure. It is thus a very simple operation to remove the cultivator beam or to replace same, and this operation may be accomplished without the use of any special tools, except such tools as may be necessary to remove the cotter pins 33 and 34. This provides a substantial saving in time and labor in the removal and replacement of cultivator beams, as compared with the amount of time and labor required to remove and replace a cultivator beam in the cultivators heretofore employed.

While a specific embodiment of an improved hitch means for fastening the tine beam of a cultivator to the frame of a cultivator has been disclosed in the foregoing description, it will be understood that various modifications within the spirit of the invention may occur to those skilled in the art. Therefore, it is intended that no limitations be placed on the invention except as defined by the scope of the appended claims.

Having described the invention, I claim:

1. In a cultivator, a frame including a pair of transverse supports, respective spaced longitudinally aligned horizontal, longitudinal box elements secured to said transverse supports, a longitudinal beam member provided with a depending standard, a cultivator tine secured to the lower end of said standard, respective horizontal pin elements secured on said beam member and spaced to be simultaneously received in said box elements, and detachable means lockingly securing said pin elements in said box elements.

2. In a cultivator, a frame including a pair of transverse supports, respective spaced longitudinally aligned, horizontal, longitudinal box elements secured to said transverse supports, a longitudinal beam member provided with a depending standard, a cultivator tine secured to the lower end of said standard, respective horizontal pin elements secured on said beam member and spaced to be simultaneously received in said box elements, and respective vertical pins engaged through the top and bottom walls of the box element and through said first-named pin elements, lockingly securing said first-named pin elements in said box elements.

3. In a cultivator, a frame including a pair of transverse supports, respective spaced longitudinally aligned, horizontal, longitudinal box elements of rectangular cross section secured to said transverse supports, a longitudinal beam member provided with a depending standard, a cultivator tine secured to the lower end of said standard, respective horizontal pin elements secured on said beam member, said horizontal pin elements being of rectangular cross section and being shaped to slidably fit within the box elements, said pin elements being spaced apart longitudinally substantially the same distance as the box elements and being arranged to be simultaneously received in said box elements, and respective vertical pins engaged through the top and bottom walls of the box elements and through said first-named pin elements, lockingly securing said first-named pin elements in said box elements.

4. In a cultivator, a frame including a pair of transverse supports, respective spaced longitudinally aligned, horizontal, longitudinal box elements of rectangular cross section secured to the under sides of said transverse supports, a longitudinal beam member provided with a depending standard, a cultivator tine secured to the lower end of said standard, respective horizontal pin elements secured on said beam member in spaced parallel relation to said beam member, said horizontal pin elements being of rectangular cross section and being shaped to slidably fit within the box elements, said pin elements being spaced apart longitudinally substantially the same distance as the box elements and being arranged to be simultaneously received in said box elements, and respective vertical pins engaged through the top and bottom walls of the box elements and through said first-named pin elements, lockingly securing said first-named pin elements in said box elements.

References Cited in the file of this patent
UNITED STATES PATENTS

| | | |
|---|---|---|
| 552,930 | Smith | Jan. 14, 1896 |
| 2,070,155 | Day, Jr. | Feb. 9, 1937 |